United States Patent [19]

Elias

[11] Patent Number: 4,546,045
[45] Date of Patent: Oct. 8, 1985

[54] METHOD FOR REDUCING TEMPERATURE RISE OF HEAT SENSITIVE SUBSTRATES

[75] Inventor: Richard C. Elias, Allison Park, Pa.

[73] Assignee: PPG Industries, Inc., Pittsburgh, Pa.

[21] Appl. No.: 686,880

[22] Filed: Dec. 27, 1984

[51] Int. Cl.$^4$ .......................... B05D 7/04; B32B 27/08
[52] U.S. Cl. .................................... 428/424.6; 427/160
[58] Field of Search ...................... 427/160; 428/424.6

[56] References Cited

U.S. PATENT DOCUMENTS

| | | | |
|---|---|---|---|
| 3,816,271 | 6/1974 | Greenberg | 204/51 |
| 4,289,677 | 9/1981 | Supcoe et al. | 260/33.6 |
| 4,311,623 | 1/1982 | Supcoe . | |
| 4,424,292 | 1/1984 | Ravinovitch et al. . | |

FOREIGN PATENT DOCUMENTS

| | | |
|---|---|---|
| 0057330 | 8/1982 | European Pat. Off. . |
| 1281871 | 7/1972 | United Kingdom . |
| 1444563 | 8/1976 | United Kingdom . |
| 1572728 | 8/1980 | United Kingdom . |

OTHER PUBLICATIONS

Military Specification E-46096C(MR) Published By The U.S. Army Jul. 16, 1973.
Sell, "Camouflage Practices", Technical Rpt. AFA-PL-TR-67-138, Published 12-67 By The Air Force Aero-Propulsion Lab, Wright-Patterson Air Force Base, Ohio, pp. 25-33 and 91-101.
M. Tomkins and H. Tomkins, "The Design Of Heat-Reflective Paints," Journal Of Oil And Colour Chemists' Assoc., Jan., 1958, pp. 98-108, Published By The Oil And Colour Chemists' Assoc., Priory House, 967 Harrow Road, Wembley, Middlesex, HAO 2 SF, England.
Krewinghaus, "Infrared Reflectance Of Paints", vol. 8, No. 4, Apr., 1969, pp. 807 to 812 of Applied Optics, Published By The Optical Society Of America, 1816 Jefferson Place, Northwest, Washington, DC 20036.
Hunter, *The Measurement Of Appearance*, pp. 6-17, Copyright 1975 By Wiley-Interscience, John Wiley And Sons, Inc., NY, NY.
F. W. Billmeyer, Jr., And M. Saltzman, Principles Of Color Technology, 2nd Edition, pp. 26-66, 101-105 and 185-189, Published By John Wiley And Sons, Inc., New York, NY.
G. J. Chamberlin And D. G. Chamberlin, *Colour Its Measurement Computation And Application* pp. 50-68, Copyright 1980 By Heyden And Son, Ltd. London, England.
Kirk-Othmer, Encyclopedia Of Chemical Technology, vol. 5, Second Edition, pp. 801 to 805, Interscience Publishers, A Division Of John Wiley & Sons, Inc., New York, NY.
Evans, "The Perception Of Color" *Industrial Color Technology*, A Symposium Sponsored By The Div. Of Industrial & Engineering Chemistry At The 156th Mtg Of The Ame. Chem. Soc. In Atlantic City, NJ., 9-1-1-68, Advances In Chemistry Series, No. 107 Copyright 1972, Published By Ame. Chem. Soc., Wash., DC.

*Primary Examiner*—James R. Hoffman
*Attorney, Agent, or Firm*—Linda Pingitore

[57] ABSTRACT

A method is described for reducing the temperature rise associated with sunlight exposure of non-metallic substrates, more particularly heat sensitive polymeric substrates. The method involves coating the substrate with a coating composition comprising a film-forming polymer and an effective amount of an infrared reflective pigment, said coating composition having a CIELAB L* value of up to 70 and resulting in the coated substrate reflecting at least 45 percent of impinging infrared energy. Also described is a coated article prepared the aforedescribed method.

12 Claims, No Drawings

METHOD FOR REDUCING TEMPERATURE RISE OF HEAT SENSITIVE SUBSTRATES

BACKGROUND OF THE INVENTION

The present invention relates to non-metallic materials and more particularly to heat sensitive non-metallic materials.

Non-metallic, heat sensitive surfaces such as polyvinyl chloride house siding absorb solar energy upon exposure to the sun and exhibit polymeric degradation after extended periods. This effect is particularly pronounced when the polyvinyl chloride is pigmented in dark colors such as brown. The degradation spoken of can be a partial or total loss of structural integrity, a darkening or discoloration of the product, a loss of flexibility of resilience, loss of shape due to softening or any combination of these effects.

These difficulties have been typically dealt with by forming an extruded composite which is made by forming a protective coextruded layer of molding composition on the outside surface of the polyvinyl chloride structural member. This protective molding composition i.e., capstock, has been pigmented with infrared reflective pigments which serve to reduce heat absorption and, therefore, reduce the temperature rise in the polyvinyl chloride structural member. Examples of this art recognized manner of protecting heat sensitive building substrates can be found in G.B. No. 1,444,563 and G.B. No. 1,572,728. Also, exemplary is U.S. Pat. No. 4,424,292 which is directed to an improved vinyl polymer composition containing an effective amount of an infrared reflecting black pigment made up of a mixture of chromic oxide and ferric oxide. This patent discloses both the extruded composite described above as well as conventional compression or injection molded members which contain the pigments in the polyvinyl chloride composition.

The aforedescribed art-recognized methods have a variety of disadvantages, among them the fact that color choices are extremely limited. This is a need, therefore, for a more efficient way of reducing the heating of heat sensitive surfaces, particularly those which are darkly pigmented, upon prolonged exposure to infrared and ultraviolet light.

SUMMARY OF THE INVENTION

In accordance with the present invention there is provided a method for reducing the temperature rise associated with sunlight exposure of non-metallic substrates, which comprises coating the non-metallic substrate with a coating composition comprising a film-forming polymer and an effective amount of an infrared reflective pigment, said coating composition having a CIELAB L* value of up to 70 and resulting in the coated substrate reflecting at least 45 percent of impinging infrared energy. More particularly, the non-metallic substrate is a heat sensitive polymeric substrate. Also provided is a coated article prepared by the above method.

DETAILED DESCRIPTION OF THE INVENTION

The present invention is directed to a method for reducing the temperature rise associated with sunlight exposure of non-metallic substrates. Preferably, the non-metallic substrate is a heat sensitive substrate, more particularly a heat sensitive polymeric substrate. The method comprises coating the substrate with a coating composition resulting in the coating substrate reflecting at least 45 percent of impinging infrared energy. The coating composition comprises a film-forming polymer and an effective amount of an infrared reflective pigment. The coating composition has a CIELAB L* value of up to 70.

The film-forming polymer can be selected from a wide variety of resinous materials. Preferably, the film-forming polymer is selected such that it provides a durable film. Depending upon the particular choice of polymer, the durability can be designed for interior or exterior purposes. For example, by exterior durability it is meant that the film maintains its integrity and appearance and does not exhibit yellowing or severe chalking upon exterior exposure for prolonged periods. Moreover, the film is hard and resists abrasion. Examples of suitable film-formers include, acrylic resins, alkyd resins, hydroxy functional alkyd resins, and a variety of polymeric polyols such as oil free polyester polyols, and polyurethane polyols of various types such as poly(ester-urethane) polyols.

The alkyd resins useful herein are polyesters of polyhydroxyl alcohols and polycarboxylic acids chemically combined with various drying, semi-drying and non-drying oils or fatty acids in different proportions. Thus, for example, the alkyd resins are made from polycarboxylic acids such as phthalic acid, maleic acid, fumaric acid, isophthalic acid, succinic acid, adipic acid, azelaic acid, sebacic acid as well as from anhydrides of such acids, where they exist. The polyhydric alcohols which are reacted with the polycarboxylic acid include glycerol, trimethylolethane, trimethylolpropane, pentaerythritol, sorbitol, mannitol, ethylene glycol, diethylene glycol and 2,3-butylene glycol.

The alkyd resins are produced by reacting the polycarboxylic acid and the polyhydric alcohol together with a drying, semi-drying or non-drying oil or fatty acid in proportions depending upon the properties desired. The oils or fatty acids are coupled into the resin molecule by esterification during the manufacturing and become an integral part of the polymer. The oil or fatty acid is fully saturated or predominately unsaturated. The fully saturated oils or acids tend to give a plasticizing effect to the alkyd, whereas the predominately unsaturated oils tend to crosslink and dry rapidly with oxidation to give tougher alkyd resins. Suitable oils include coconut oil, fish oil, linseed oil, tung oil, castor oil, cottonseed oil, safflower oil, or soybean oil. Fatty acids can be derived from the above oils or tall oil. Various proportions of the polycarboxylic acid, polyhydric alcohol, oil, or fatty acid are used to obtain alkyd resins of various properties. Hydroxyl functional alkyds are also useful herein.

Oil free polyester polyols can also be used as the film-forming component of the invention. Such polyester polyols can be prepared by the polyesterification of an organic polycarboxylic acid or anhydride thereof with organic polyols and/or an epoxide. Usually, the polycarboxylic acids and polyols are aliphatic or aromatic dibasic acids and diols.

The diols which are usually employed in making the polyester include alkylene glycols, such as ethylene glycol, neopentyl glycol and other glycols such as hydrogenated Bisphenol A, cyclohexanediol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality can also be used. Examples include trimethylolpropane, trimethylolethane, pentaerythritol and the like, as well as higher molecular weight polyols such as those produced by oxyalkylating lower molecular weight polyols.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid, decanoic acid, dodecanoic acid, and other dicarboxylic acids of varying types. The polyester may include minor amounts of monobasic acids such as benzoic acid, stearic acid, acetic acid, hydroxystearic acid and oleic acid. Also, there may be employed higher polycarboxylic acids such as trimellitic acid and tricarballylic acid. Where acids are referred to above, it is understood that anhydrides of those acids which form anhydrides can be used in place of the acid. Also, lower alkyl esters of the acids such as dimethyl glutarate and dimethyl terephthalate can be used.

Besides polyester polyols formed from polybasic acids and polyols, polylactone-type polyesters can also be employed. These products are formed from the reaction of a lactone such as epsilon-caprolactone and a polyol.

In addition, hydroxy-containing acrylic polymers or acrylic polyols can be used as the polyol component. Among the acrylic polymers are interpolymers of hydroxy-containing vinyl monomers such as hydroxyalkyl acrylate and methacrylate having 2 to 6 carbon atoms in the alkyl group and other ethylenically unsaturated copolymerizable materials such as alkyl acrylates and methacrylates. Examples of suitable hydroxyalkyl acrylates and methacrylates are acrylic acid and methacrylic acid esters of ethylene glycol and propylene glycol. Also useful are hydroxy-containing esters and/or amides of unsaturated acids such as maleic acid, fumaric acid, itaconic acid and the like. Examples of suitable alkyl acrylates and methacrylates are lauryl methacrylate, 2-ethylhexyl methacrylate and n-butyl acrylate.

Besides the acrylates and methacrylates, other copolymerizable monomers which can be copolymerized with the hydroxyalkyl acrylates and methacrylates are ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, alpha-methyl styrene, alpha-methyl chlorostyrene, vinyl butyrate, vinyl acetate, allyl chloride, divinyl benzene, diallyl itaconate, triallyl cyanurate and mixtures thereof. Usually these other ethylenically unsaturated materials are used in admixture with the above-mentioned acrylates and methacrylates.

Besides the above-mentioned polymeric polyols, polyurethane polyols can also be used. These polyols can be prepared by reacting any of the above-mentioned polyols with a minor amount of polyisocyanate (OH/NCO equivalent ratio greater than 1:1) so that free hydroxyl groups are present in the product. In addition to the high molecular weight polyols mentioned above, mixtures of both high molecular weight and low molecular weight polyols may be used. Among the low molecular weight polyols are diols and triols such as aliphatic polyols including alkylene polyols containing from 2 to 18 carbon atoms. Examples include ethylene glycol, 1,4-butanediol, 1,6-hexanediol; cycloaliphatic polyols such as 1,2-hexanediol; and cyclohexanedimethanol. Examples of triols include trimethylolpropane and trimethylolethane. Also useful are polyols containing ether linkages such as diethylene glycol and triethylene glycol. Also, acid-containing polyols such as dimethylolpropionic acid can also be used.

The organic isocyanate which is used to prepare the polyurethane polyols can be an aliphatic or an aromatic isocyanate or a mixture of the two. Aliphatic isocyanates are preferred since it has been found that these provide better color stability in the resultant coating. Also, diisocyanates are preferred although higher polyisocyanates and monoisocyanates can be used in place of or in combination with diisocyanates. Where higher functionality polyisocyanates are used, some reactive material to reduce the functionality of the polyisocyanate may be used, for example, alcohols and amines. Also, some monofunctional isocyanate may be present. Examples of suitable higher polyisocyanates are 1,2,4-benzene triisocyanate and polymethylene polyphenyl isocyanate. Examples of suitable monoisocyanates are butyl isocyanate, cyclohexyl isocyanate, phenyl isocyanate and toluene isocyanate. Examples of suitable aromatic diisocyanates are 4,4'-diphenylmethane diisocyanate, 1,3-phenylene diisocyanate, 1,4-phenylene diisocyanate and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed and are actually preferred because of color stability and imparting hardness to the product. Examples include 1,4-cyclohexyl diisocyanate, isophorone diisocyanate, alpha, alpha-xylylene diisocyanate and 4,4'-methylene-bis-(cyclohexyl isocyanate).

In addition to the above-described materials, where they can be prepared, organosilicon modified versions of these materials can also be used.

In the embodiments wherein the film-former contains active hydrogen functionality, there usually is also present a curing agent adapted to cure said film-former, for example, aminoplast or isocyanate curing agents including blocked isocyanates. These are described fully below.

Aminoplast condensates are obtained from the reaction of formaldehyde with an amine or an amide. The most common amines or amides are melamine, urea or benzoguanamine, and are preferred. However, condensates with other amines and amides can be employed, for example, aldehyde condensates or diazines, triazoles, guanidines, guanamines and alkyl and aryl di-substituted derivatives of such compounds including alkyl and aryl-substituted ureas and alkyl and aryl-substituted melamines and benzoguanamines. Some examples of such compounds are N,N-dimethylurea, N-phenylurea, dicyandiamide, formoguanamine, acetoguanamine, 6-methyl-2,4-diamino-1,3,5-triazine, 3,5-diaminotriazole, triaminopyrimidine, 2,6-triethyltriamine-1,3,5-triazine and the like.

While the aldehyde employed is most often formaldehyde, other aldehydes such as acetaldehyde, crotonaldehyde, benzaldehyde and furfuryl may be used.

The aminoplast contains methylol or similar alkylol groups are preferably at least a portion of these alkylol groups are etherified by reaction with an alcohol to provide organic solvent-soluble resins. Any monohydric alcohol can be employed for this purpose including such alcohols as methanol, ethanol, butanol and hexanol.

Preferably, the aminoplasts which are used are melamine, urea- or benzoguanamine-formaldehyde condensates etherified with an alcohol containing 1 to 4 carbon atoms such as methanol, ethanol, butanol or mixtures thereof.

Polyisocyanates and blocked polyisocyanates may also be used as curing agents. Examples of suitable polyisocyanates include monomeric polyisocyanates such as toluene diisocyanate and 4,4'-methylene-bis-(cyclohexyl isocyanate), isophorone diisocyanate and NCO-prepolymers such as the reaction products of monomeric polyisocyanate such as those mentioned above with polyester of polyether polyols. Particularly useful isocyanates are the isocyanurate from isophorone isocyanate commercially available from Chemische Werke Huls AG as T1890 and the biuret from 1,6-hexamethylene diisocyanate commercially available from Bayer as DESMODUR N. The polyisocyanate may optionally be blocked. Examples of suitable blocking agents are those materials which would unblock at elevated temperatures such as low aliphatic alcohols such as methanol, oximes such as methyl ethyl ketone oxime, and lactams such as caprolactam. Blocked isocyanates can be used to form stable one-package systems. Polyfunctional isocyanates with free isocyanate groups can be used to form two-package room temperature curable systems. In these systems, the polyester and isocyanate curing agents are mixed just prior to their application.

The coating composition used in the method of the present invention contains an infrared reflective pigment. The pigment is present in an effective amount; that is, an amount such that the coated substrate is capable of reflecting at least 45 percent of impinging infrared energy. The pigment is selected such that the coating composition has a CIELAB L* value of up to 70. Typically, the pigment is present in an amount ranging from 10 percent by weight to 60 percent by weight, based on resin solids.

The infrared reflectivity (solar radiant energy in the reflectance mode) can be measured utilizing a Beckman Model 5270 UV/Visible-Near Infrared Spectrophotometer equipped with an integrating sphere. The spectrophotometer can be interfaced to an IBM Model 370/148 computer for data collection and analysis. The sample is placed in direction contact with the integrating sphere aperture. The sample is also backed by a light trap that is designed to have less than one percent reflectance at all wavelengths. The spectrophotometer is calibrated using matched pairs of calibration standards for the selected range. The calibration standard for reflectance measurements is a 747 first surface aluminum mirror and the ranges for near-infrared and UV/visible are 2,100 nanometers to 800 nanometers; 770 nanometers to 400 nanometers, 400 nanometers to 300 nanometers, respectively. The solar energy transmitted is integrated over the range 2,100 nanometers to 300 nanometers using the standard solar energy distribution curve for weighted ordinates, air mass 2, at sea level. Data are collected at 50 nanometer intervals between 2,100 nanometers and 800 nanometers and at 10 nanometer intervals between 770 nanometers and 300 nanometers. The reflectance values obtained include the specular component and are absolute; that is, they are corrected for the absolute reflectance of the calibration standard.

The CIE system for defining color space was standardized in 1931 by the International Commission for Illumination and is now called the CIE trichromatic colorimetric coordinate system. The initials CIE are for the French translation of the original ICI, thus honoring the 1931 meeting at which the standard was adopted.

The CIE L* a* b* values, with the official abbreviation CIELAB, are a way of defining color space based on a lightness-darkness coordinate (L*), a redness-greenness coordinate (a*), and a yellowness-blueness coordinate (b*). The description of color space based on the CIE system is a very complex subject which is not necessary for the purposes of the present application. A detailed discussion can be found in Fred W. Billmeyer, Jr., and Max Saltzman, *Principles of Color Technology*, 2nd edition, John Wiley and Sons, pages 25 to 110. This textual material is herein incorporated by references.

For the purposes of the present invention, the CIELAB L* value is of most importance. An important feature of the present invention is that the coating composition has a CIELAB L* value of up to 70. By this is meant that the coating composition is dark in color. A CIELAB L* value of greater than 70 means that the coating composition is light in color.

The CIELAB L* value as well as the a and b values are mathematically determined, typically by a computer, from spectral reflectance measurements. This method is well understood by those skilled in the art. The spectral reflectance can be measured using a Macbeth MS2020 pulsed xenon spectrophotometer with sphere geometry providing diffuse illumination and 8° viewing. The spectrophotometer is typically interfaced to a DEC Model PDP 11/70 mainframe computer for data collection and analysis. The sample is placed in direct contact with the integrating sphere part of the spectrophotometer. The spectrophotometer is calibrated using a white reference tile supplied by the Macbeth Company. The reference tile is a white ceramic tile that has been standardized against pressed $BaSO_4$. The resulting reflectance values are stored by permanently imprinting them into a memory chip. Daily calibration involves measuring the white reference tile and comparing the reflectance values obtained to the stored reflectance values. Correction factors are determined for the particular day and all subsequent measurements are adjusted by these factors. Data are collected at 20 nanometer intervals between 700 nanometers and 400 nanometers. The reflectance values obtained include the specular component. The adjusted reflectances for the samples are integrated over the range 700 nanometers to 400 nanometers using the weight ordinate method for a specific illuminant. The values generated by the computer are known as the tristimulus values X, Y and Z and it is these values which are used to calculate the CIE L*, a* and b* values. These values are also generated by the computer, however, the following formulas are included to show the manner of the calculation.

$$L^* = 116 \, (Y/Y_n)^{\frac{1}{3}} - 16$$

$$a^* = 500 \, \{(X/X_n)^{\frac{1}{3}} - (Y/Y_n)^{\frac{1}{3}} - \}$$

$$b^* = 200\{(Y/Y_n)^{\frac{1}{3}} - (Z/Z_n)^{\frac{1}{3}}\}$$

$X_n$, $Y_n$ and $Z_n$ are the tristimulus values for the white reference tile.

Examples of suitable infrared reflective pigments include the following list. Mixtures of infrared reflective pigments can also be utilized if desired.

Crystal Violet Benzoate Lake
Methyl Violet Benzoate Lake
Violet Tonel
Victoria Pure Blue BO Benzoate Lake
Blue Toner
Dianisidine Blue Toner
Peacock Blue Lake
Indigo Blue
Phthalo Green
Chromium Oxide, light and dark
Hydrate Chromium oxide, light and dark
Bismarck Brown Benzoate Lake
Benzidine Yellow Toner
Meteor Yellow Buff
Hansa Yellow G Toner
Fast Light Yellow 3G Lake
Tartrazine Tellow Lake
Helio Fast Yellow 6GL
Chrome Yellow, primrose
Chrome Yellow, light and medium
Benzidine Orange Toner
Dianisidine Orange Toner
Dinitroaniline Orange Toner
Hansa Orange Toner
Persian Orange Lake
Indanthrene Brilliant Orange GRA
Chrome Orange, light, medium and dark
Mineral Orange
Fuchsine Benzoate Lake
Rhodamine B Benzoate Lake
Safranine Benzoate Lake
Anisidine Red Toner
Dichloroaniline Red Toner
Nitroanisidine Maroon Toner
Permanent Red F$_4$R
Toluidine Maroon Toner
Vulcan Fast Red BA
B.O.N. Maroon Toner
Phloxine Toner
Alizarine Maroon Lake
Red Toner HHJ
Animal Carmine
Cadmium Red, light, medium and deep
Red Iron Oxide, light
Black Toner
Lithopone
Perylene Black
Titanium Dioxide Besides being durable, the coating compositions of the present invention can be flexible. By flexible is meant that when it is deposited on an uncoated, rigid polyvinyl chloride substrate which has an impact resistance of at least about 1.25 inch pounds per mil of substrate at 0° F. and 3.0 inch pounds per mil of substrate at 78° F. as determined by ASTM D 2794–82, and cured, the coated substrate also has an impact resistance of at least about 1.25 inch pounds per mil of substrate of 0° F. and 3.0 inch pounds per mill of substrate at 78° F. as determined by ASTM D 2794–82.

The aforesaid ASTM method can be summarized in the following manner. The coating composition under test is applied to a suitable rigid polyvinyl chloride panel and cured. After curing, a standard weight is dropped a distance so as to strike an indentor that deforms the coating and the substrate. The indentation can be either an intrusion or an extrusion. By gradually increasing the distance the weight drops, the point at which failure usually occurs can be determined. Films usually fail by cracking, which can be made more visible on polyvinyl chloride by, for example, the use of a magnifier or by the use of a pin hole detector. By impact resistance is meant the number of inch-pounds (kilogram-meters) required to produce cracking in the deformed coating. A suitable instrument for determining impact resistance is a Gardner-SPI Modified Variable Height Impact Tester available from Gardner Laboratory.

It should be understood that a variety of rigid polyvinyl chloride materials are available commercially and each is formulated in a slightly different fashion because of the particular choice of additives used by the individual supplier. Irrespective of the commercial source, however, if the uncoated substrate meets the impact specifications detailed above prior to being coated according to the method of the present invention, then it should meet those impact specifications subsequent to being coated. GEON 85862, from B. F. Goodrich is exemplary of a commercial source of rigid polyvinyl chloride.

The heating build-up due to the absorption of solar energy in rigid polyvinyl chloride exterior building materials is predicted based upon data obtained by experimentally determining in the laboratory the temperature rise above ambient temperature under an ultraviolet heat lamp, relative to black. The highest heat build-up, 41° C., occurs in carbon black pigmented polyvinyl chloride. This is measured experimentally in Arizona at 45° C., perpendicular to the sun on a cloudless day with no wind and heavy insulation on the back of the specimen.

The claimed method is advantageous in that it results in reduced heat absorption and build-up by heat sensitive surfaces such as polyvinyl chloride house siding. The coated substrate of the present invention coated with a coating composition containing infrared reflective pigment results in reduced absorption of ultraviolet light which thus leads to less surface temperature increase and less heat absorption by the heat sensitive building material substrate. Therefore, polymeric degradation of the substrate is minimized along with the resultant detrimental effect on the physical properties. The method is particularly advantageous in that heat sensitive surfaces can now be made available in dark colors such as brown, while at the same time achieving a heat absorption and heat build-up which is comparable to white. Previously, dark-colored heat sensitive surfaces were disadvantageous because of the excessive heat build-up and detrimental effect on physical properties which resulted.

The following examples are illustrative of the invention and are not meant to limit it to their details.

EXAMPLE I

A dark brown coating composition for use in the method of the present invention is detailed below.

| Ingredients | Parts by Weight |
|---|---|
| Component A: | |
| Saturated polyester polyol[1] | 182.40 |
| Polyether polyol[2] | 130.00 |
| Suspension Agent[3] | 3.74 |
| Silicone solution[4] | 3.74 |
| Wetting agent[5] | 5.65 |
| Ultraviolet Absorber[6] | 5.65 |
| Ultraviolet Absorber[7] | 5.65 |
| Xylene | 102.57 |
| Monomethyl ether of propylene glycol acetate | 266.38 |
| Brown pigment[8] | 88.00 |
| Green pigment[9] | 1.13 |
| White pigment[10] | 54.56 |
| Yellow pigment[11] | 20.87 |
| Talc | 169.17 |
| The above components were combined and ground to a 6.0 Hegman grind and then the following components were added. | |
| Magnesium silicate | 24.17 |
| Component B: | |
| Xylene | 114.65 |
| Monomethyl ether of propylene glycol acetate | 297.59 |
| Polyfunctional aliphatic isocyanate[12] | 161.04 |
| Polyfunctional aliphatic isocyanate[13] | 280.28 |
| Dibutyltin diacetate | 2.63 |

[1] This saturated polyester polyol was prepared from 2 moles of PCP 0301, a lactone polyol commercially available from Union Carbide and 1 mole of azelic acid in the presence of an acid catalyst. It had an average hydroxyl equivalent weight of 220 to 260, an acid value of less than one and was at 98 percent solids in cyclohexane.
[2] Polytetramethylene ether glycol having 1000 molecular weight commercially available from Quaker Oats as POLYMEG 1000.
[3] This wax is commercially available from POLY-RESIN as MPA-1078.
[4] This silicone is commercially available from GE-MILCHAP as SF 1023.
[5] Anti Terra U silicone commercially available from BYK-MallinKrodt
[6] TINUVIN 292, hindered amine ultraviolet light stabilizer commercially available from Ciba-Geigy.
[7] TINUVIN 328, substituted benzotriazole ultraviolet light stabilizer commercially available from Ciba-Geigy.
[8] Manganese Antimony Titanium Buff Rutile is commercially available from Ciba-Geigy as 10364 Brown pigment.
[9] Commercially available from Sun Chemical as 264-8142 Phthalo Green Pigment.
[10] Commercially available from E. I. Dupont de Nemours Company as R960 Titanium dioxide.
[11] Commercially available from Harshaw as 7370 Meteor Yellow Buff pigment.
[12] Commercially available from Chemische-Werke Huls AG as T1890.
[13] Commercially available from Mobay Chemical Company as L2291.

The coating composition was prepared by combining, with agitation, components A and B in a 1 to 1 ratio by volume. The following substrate materials were tested:

(a) Control: A rigid, dark brown polyvinyl chloride (PVC) substrate prepared by laminating a 4 mil thick polyvinyl chloride sheet onto a 40 mil thick base sheet of gray polyvinyl chloride. This substrate was not coated with a coating composition. The dark brown color of this uncoated laminate was essentially the same as the dark brown color of the coating composition of Example I used to coat (b), (c) and (d).
(b) A rigid, dark brown polyvinyl chloride laminate as described in (a) which was coated with the coating composition of Example I, above.
(c) A rigid, gray polyvinyl chloride substrate which was coated with the coating composition of Example I, above.
(d) A rigid, white polyvinyl chloride substrate which was coated with the coating composition of Example I, above.
(e) A rigid, white polyvinyl chloride substrate. This substrate was not coated with a coating composition.

The test samples (b), (c) and (d) were prepared by spraying the coating composition onto the substrate and baking it for 20 minutes at 130° F (54.4° C.). The samples were evaluated for maximum vertical temperature rise above ambient temperature according to the following generally accepted method.

The apparatus for measuring temperature rise above ambient air temperature consisted of a wooden box (53.3±2.5 cm×33.0±2.5 cm×29.2±2.5 cm) opened from the top, and lined with 2.54 centimeters of white, rigid, hydrous calcium silicate heat insulation; a 250 watt white infrared heat lamp; 40 gauge type J (iron-constantan) thermocouple; and a type J digital read-out temperature meter. The thermocouple was placed through the bottom of the box so that it was constantly fixed in the same position. The lamp was installed perpendicular to the thermocouple. The distance from the bottom of the box to the bottom surface of the lamp was 39.4 millimeters. The sample under study was placed on the bottom of the box so that its center touched the thermocouple. The apparatus was placed in a location free of air drafts to minimize inconsistent results.

The samples tested measured 3×3×0.003 inches with a smooth surface. The black control had 0.41 percent of carbon black without other pigments. The black control sample was prepared by coating a dark brown substrate as described above in (a) with a black coating composition. The maximum sample temperature was read when the temperature did not continue to increase. The maximum temperature of the black control was read within two hours of the other temperature rise measurements. The ambient air temperature was measured outside the box and was 75° F. (24° C.). The temperature rise above ambient temperature (T) for the black control was 63° C. The predicted heat build up ($T_B$) of the black control was 63° C.

The temperature rise above ambient temperature (T) is equal to the maximum temperature of the specimen (Tm) as read from the digital meter minus the ambient air temperature (Ta). The predicted heat build-up ($T_B$) equals the temperature rise above ambient temperature (T) of the sample divided by the temperature rise above ambient temperature for a black control multiplied by 41° C. which is the heat build-up of a black control sample experimentally determined in the sun in Arizona, at 45° C., perpendicular to the sun on a cloudless day with no wind and heavy insulation on the back of the specimen.

The results are set out below.

| Sample | Substrate | Coating Composition on Surface | CIELAB L* Value | Percent Infrared Reflectance | T Temperature Rise Above Ambient Temperature | $T_B$ Predicted Heat Build-Up |
|---|---|---|---|---|---|---|
| Control (a) | dark brown PVC laminate | none | 46.4 | 19.5 | 128° F. (53° C.) | 52.3° C. |
| (b) | dark brown PVC laminate | dark brown coating composition of Example I | 47.7 | 56.7 | 118° F. (47° C.) | 47.9° C. |
| (c) | gray PVC | dark brown coating composition of Example I | 47.7 | 54.4 | 112° F. (44° C.) | 44.2° C. |

| | | | -continued | | | |
|---|---|---|---|---|---|---|
| (d) | white PVC | dark brown coating composition of Example I | 47.7 | 59.0 | 109° F. (42° C.) | 42.8° C. |
| | | | Comparative Test | | | |
| (e) | white PVC | none | 89.4 | 90.1 | 104° F. (40° C.) | 40.1° C. |

The results demonstrate that samples coated according to the method of the claimed invention result in substantially reduced heat build-up relative to the control sample. The heat build-up of the samples of the present invention are more comparable to the heat build-up of an uncoated white polyvinyl chloride substrate.

What is claimed is:

1. A method for reducing the temperature rise associated with sunlight exposure of non-metallic substrates, which comprises coating the non-metallic substrate with a coating composition comprising a film-forming polymer and an effective amount of an infrared reflective pigment, said coating composition having a CIELAB L* value of up to 70 and resulting in the coated substrate reflecting at least 45 percent of impinging infrared energy.

2. The method of claim 1 wherein the coating composition additionally contains a curing agent adapted to cure said film-forming polymer.

3. The method of claim 1 wherein the film-forming polymer is a polyester-urethane polyol.

4. The method of claim 1 wherein the infrared reflective pigment is present in the coating composition in an amount ranging from 10 percent by weight to 60 percent by weight, on a resin solids basis.

5. A method for reducing the temperature rise associated with sunlight exposure of heat sensitive polymeric substrates, which comprises coating the heat sensitive polymeric substrate with a coating composition comprising a film-forming polymer and an effective amount of an infrared reflective pigment, said coating composition having a CIELAB L* value of up to 70 and resulting in the coating substrate reflecting at least 45 percent of impinging infrared energy.

6. The method of claim 5 wherein the coating composition is flexible such that when it is deposited on an uncoated, rigid polyvinyl chloride substrate which has an impact resistance of at least 1.25 inch pounds per mil of substrate at 0° F. and 3.0 inch pounds per mil of substrate at 78° F. as determined by ASTM D2794-82 and cured, the coated substrate has an impact resistance of at least 1.25 inch pounds per mil of substrate at 0° F. and 3.0 inch pounds per mil of substrate at 78° F. as determined by ASTM D2794-82.

7. The method of claim 5 wherein the coating composition additionally contains a curing agent adapted to cure said film-forming polymer.

8. The method of claim 5 wherein the heat sensitive substrate is rigid polyvinyl chloride.

9. The method of claim 5 wherein the film-forming polymer is a polyester-urethane polyol.

10. The method of claim 5 wherein the infrared reflective pigment is present in the coating composition in an amount ranging from 10 percent by weight to 60 percent by weight, on a resin solids basis.

11. A coated article prepared by the method of claim 1.

12. A coated article prepared by the method of claim 5.

* * * * *